(12) United States Patent
Angell et al.

(10) Patent No.: US 7,843,317 B2
(45) Date of Patent: Nov. 30, 2010

(54) ENVIRONMENTALLY SENSITIVE ELECTRONIC DEVICE

(75) Inventors: Robert L. Angell, Salt Lake City, UT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 12/042,947

(22) Filed: Mar. 5, 2008

(65) Prior Publication Data
US 2009/0224883 A1 Sep. 10, 2009

(51) Int. Cl.
*H04Q 5/22* (2006.01)
(52) U.S. Cl. ............... 340/10.5; 340/572.1; 340/10.1
(58) Field of Classification Search .......... 340/572, 340/10, 505
See application file for complete search history.

(56) References Cited
U.S. PATENT DOCUMENTS
4,778,552 A * 10/1988 Benge et al. ............. 156/272.2

| | | | | |
|---|---|---|---|---|
| 2005/0212675 | A1* | 9/2005 | Green | 340/572.8 |
| 2009/0146810 | A1* | 6/2009 | Monk et al. | 340/572.1 |
| 2009/0153334 | A1* | 6/2009 | Burns et al. | 340/572.8 |
| 2009/0224916 | A1* | 9/2009 | Angell et al. | 340/572.1 |

OTHER PUBLICATIONS

Cain, J.T. et al, "Energy Harvesting for DNA Gene Sifting and Sorting" International Journal of Parallel and Distributed Systems and Networks, vol. 4, No. 3, 2001, Pittsburgh, PA, USA.
Anonymous Disclosure, "Using Radio Frequency Identification to Ensure the Correct Chemicals Are Used for Wafer Processing" IP.Com Prior Art Database Technical Disclosure, Feb. 16, 2007.
Collins, J. "Hitachi Unveils Integrated RFID Tag" RFID Journal, WWW.RFIDJOURNAL.COM/ARTICLE/ARTICLEVIEW/556/1/1/.
Block, R. "Hitachi Shows Off 7.5 Micron Thick MU-Chip RFID Tag" ENGADGET.COM Article, Feb. 6, 2006, WWW.ENGADGET.COM/2006/02/06/HITACHI-SHOWS-OFF-7-5-MICRON-THICK-MU-CHIP-RFID-TAG/.

* cited by examiner

*Primary Examiner*—Travis R Hunnings
(74) *Attorney, Agent, or Firm*—Dillon & Yudell LLP

(57) ABSTRACT

An electronic device has at least one component that is coated with a material that is non-persistent if exposed to a specific environmental condition. If the coating is stripped off by the specific environmental condition, the previously coated component's function is altered, causing a functionality of the electronic device to be altered.

20 Claims, 4 Drawing Sheets

ENVIRONMENTALLY SENSITIVE ELECTRONIC DEVICE

BACKGROUND OF THE INVENTION

1. Technical Field

The present disclosure relates to the field of electronic devices, including, but not limited to, electronic sensors that are used to identify products and their exposure to environmental conditions.

2. Description of the Related Art

Many products are sensitive to environmental conditions. For example, a foodstuff (e.g., wheat) may become spoiled, or even toxic, if exposed to water, which can cause dangerous mold to form on the wheat. Similarly, any edible product may become toxic if contaminated with a poison. Other materials, including chemicals, may lose their useful properties, or even become hazardous, if exposed to incompatible chemicals, heat, etc.

Current processes for determining whether a product has been exposed to a harmful environmental condition are slow and expensive. For example, consider again the load of wheat that has been exposed to water. If the water has evaporated, it may not be readily apparent that the wheat got wet or that mold has grown on it. If there is a suspicion that the wheat got wet, then a sample of the wheat may be taken, swabbed onto a nutrient medium, and then cultured for several days before definitive tests can be taken to show that mold has formed. Such a process is labor intensive, slow (takes several days for the culture to confirm that the wheat got wet), and unreliable, since the process is predicated on a "suspicion that the wheat got wet." Such a suspicion may or may not ever have been raised.

Similarly, if an edible product has been exposed to poison, the residue of poison left on the edible product may be miniscule, making detection difficult, even with a sophisticated analyzer.

Likewise, if a chemical is transformed when exposed to an incompatible material, thus causing the chemical to lose its useful properties, the transformed nature of the chemical may not be noticed until a catastrophe occurs (e.g., the altered chemical causes an explosive reaction when later processed).

SUMMARY OF THE INVENTION

An electronic device has at least one component that is coated with a material that is non-persistent if exposed to a specific environmental condition. If the coating is stripped off by the specific environmental condition, the previously coated component's function is altered, causing a functionality of the electronic device to be altered.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
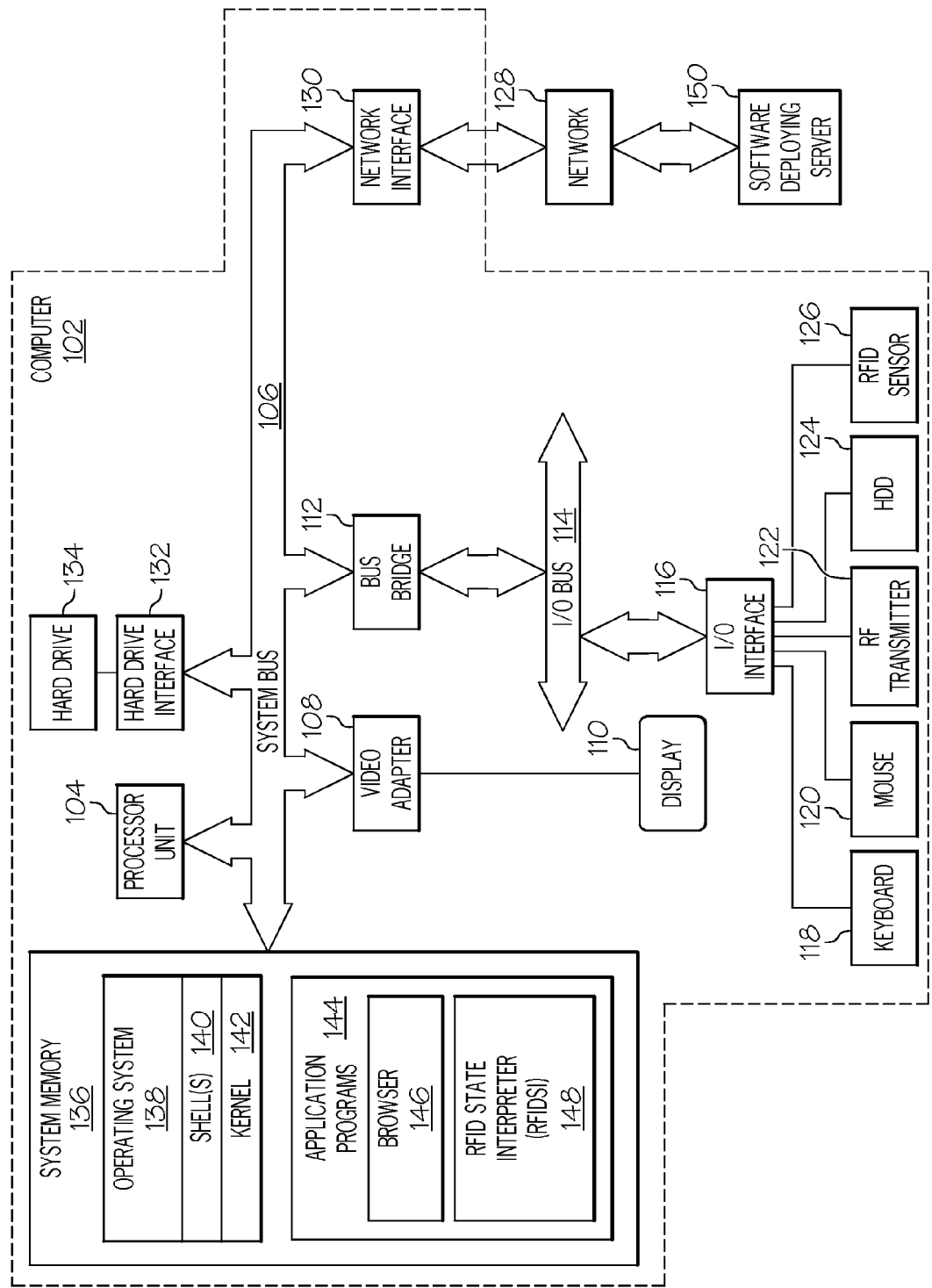
FIG. 1 depicts an exemplary computer with which the present invention may be utilized.

With reference now to the figures, and in particular to FIG. 1, there is depicted a block diagram of an exemplary computer 102, which the present invention may utilize. Note that some or all of the exemplary architecture shown for computer 102 may be utilized by software deploying server 150.

Computer 102 includes a processor unit 104, which may utilize one or more processors each having one or more processor cores, that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Radio Frequency (RF) transmitter 122, a Hard Disk Drive (HDD) 124, and a Radio Frequency Identification (RFID) sensor 126. It is recognized that RF transmitter 122 and RFID sensor 126 should be protected from one another, by distance or a shield (not shown), in order to enable proper functionality of the RFID sensor 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s)

to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a RFID State Interpreter (RFIDSI) 148. RFIDSI 148 includes code for implementing the processes described below, and particularly as described in FIG. 6. In one embodiment, computer 102 is able to download RFIDSI 148 from software deploying server 150, including in an on-demand basis. Note further that, in one embodiment of the present invention, software deploying server 150 performs all of the functions associated with the present invention (including execution of RFIDSI 148), thus freeing computer 102 from having to use its own internal computing resources to execute RFIDSI 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

The present invention is directed to a concept of coating select portions of an electronic device with one or more types of non-persistent coatings. When one or more of these coatings is exposed to a certain type of environmental condition (e.g., moisture, chemicals, radiation, heat, toxins, etc.), the coating(s) are stripped off (and thus are referred to as being "non-persistent"). When a coating is stripped off, a previously coated component is also exposed to the environmental condition (or another ambient condition, material, etc.), which results in the operation of that component, and thus then entire electronic device, to be altered. For example, consider a two-component electronic device. If exposing one of the components to an environmental condition such as water causes that component to fail (become inoperable or to change its operational characteristics), then the electronic device may now be a functionally one-component electronic device. That is, the electronic device will function differently with one component as compared to having two components. For example, if both of the components are stage amplifiers, then the electronic device would have a power signature that is different if only one or both amplifiers (components) are functional.

Now consider a scenario in which the electronic device having one or more types of non-persistent coatings is a Radio Frequency Identification (RFID) tag. An RFID tag, as known to those skilled in the art of electronic identification tags, is an electronic device use to store and communicate Electronic Product Code (EPC) information. RFID tags may be active (i.e., battery powered), semi-passive (i.e., powered by a battery and a capacitor that is charged by an RF interrogation signal), or purely passive (i.e., either have a capacitor that is charged by an RF interrogation signal or are geometrically shaped to reflect back specific portions of the RF interrogation signal). Active, semi-passive and some passive RFID tags contain an on-board Integrated Circuit (IC) chip, while other passive tags are chipless.

Figure 2:
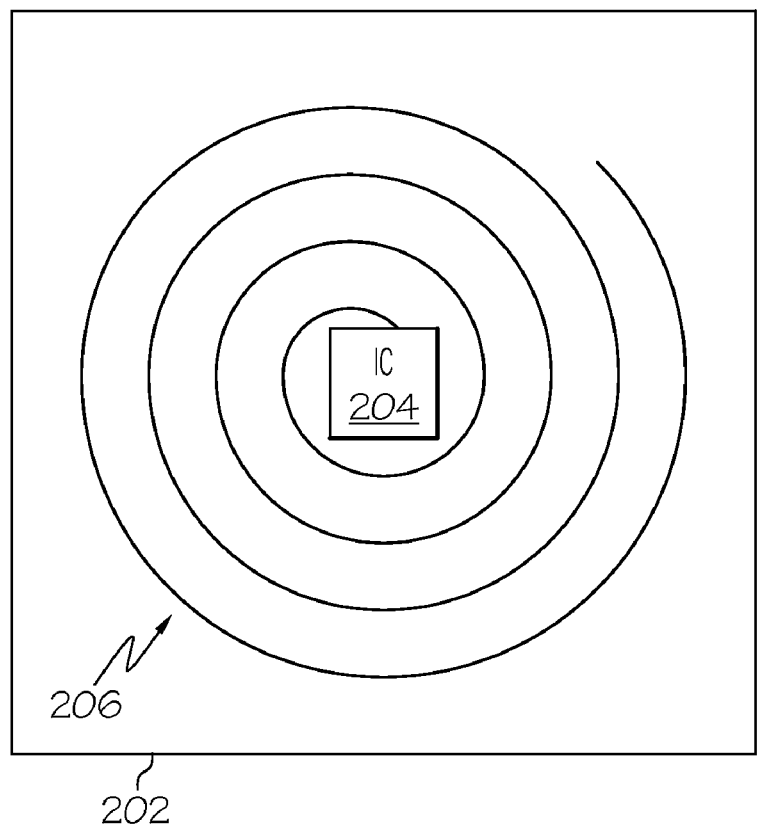
FIG. 2 illustrates a Radio Frequency Identification (RFID) tag, which is an exemplary electronic device that may be utilized in the present invention.

Consider now an RFID tag 202 shown in FIG. 2. RFID tag 202 includes an on-board IC chip 204 and a coupled antenna 206. The IC chip 204 stores and processes information, including EPC information that includes a description (name, chemical composition, manufacturer, lot number, etc.) of a product to which the RFID tag 202 is associated (either is adhered to or is unadhered in a free-flowing material). The IC chip 204 may include a low-power source (e.g., a battery, or a capacitor that is charged by an interrogation signal received by the coupled antenna). When the battery (now shown) is coupled to the coupled antenna 206, or the capacitor (not shown) is charged, the IC chip generates a radio signal that includes the EPC information, which is broadcast via the coupled antenna 206.

Figure 3:
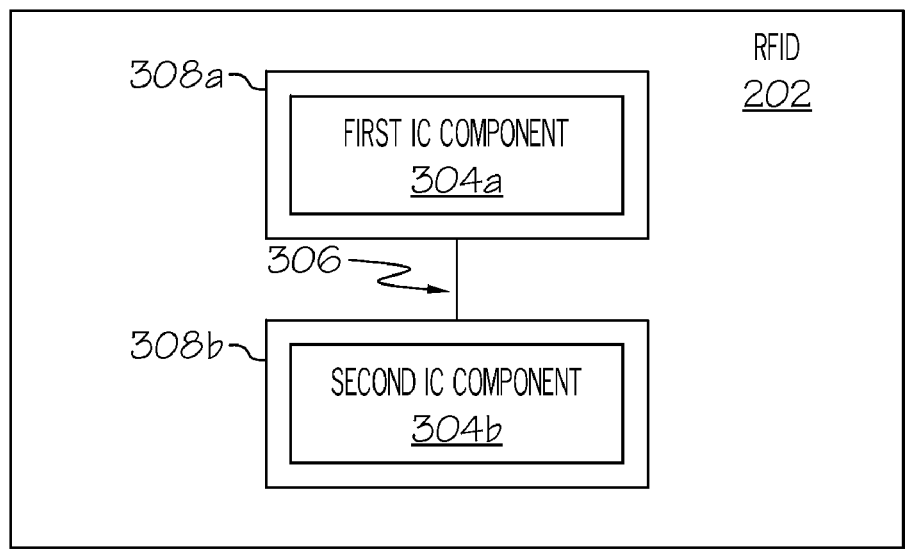
FIG. 3 depicts additional detail of coated components of the RFID tag shown in FIG. 2.

Referring now to FIG. 3, assume that the IC chip 204 shown in FIG. 2 has two components: a first IC component 304a and a second IC component 304b, which may be coupled by a link 306. Examples of first and second IC components 304a-b include, but are not limited to, different memory devices for storing first and second components of UPC information, in-line series power amplifiers, power sources, etc. That is, first and second IC components 304a-b are exemplary of any multiple components that cause the RFID 202 to function differently if both of the components 304a-b are functional, as compared to only one or another of the components being functional. (Note that while only two components are depicted, in one embodiment, RFID 202 or any other electronic device contemplated by the present invention may have any number of components 304 and/or other subcomponents that are coated in a manner described herein.)

Assume now, for continued exemplary purposes, that the first IC component 304a has a first coating 308a, while the second IC component 304b has a second coating 308b. These two coatings 308a-b may be composed of different materials, or they may be composed of different thicknesses of a same material. One or both of the coatings 308a-b are non-persistent, meaning that when exposed to a specific environmental condition (liquid, gas, temperature extreme, humidity, etc.), the coating 308a and/or 308b will dissolve, evaporate, slough off, crumble away, melt or otherwise be removed from its respective IC component 304a-b.

Assume further that when a coating 308a or 308b is removed, an ambient environmental condition will affect the operation of the previously coated component 304a-b. Note that the ambient environmental condition, which affects the underlying component 304a-b, and the specific environmental condition, which removed the coating 304a-b, may be the same or different. That is, assume that first coating 308a is melted away by heat, thus allowing ambient moisture (not shown) to penetrate the first IC component 304a, resulting in the first IC component 304a shorting out (become disabled). Assume further that the second non-persistent coating 308b is impervious to heat and ambient moisture. This leaves only the second IC component 304b functional, which will alter the operational characteristic of the entire RFID 202. As described above, the first and second IC components 304a-b may be any electronic components that operate within the RFID 202, either independently or inter-dependently, such that altering one or another of the IC components 304a-b results in an altered functionality and/or signature of the RFID 202.

Figure 4:
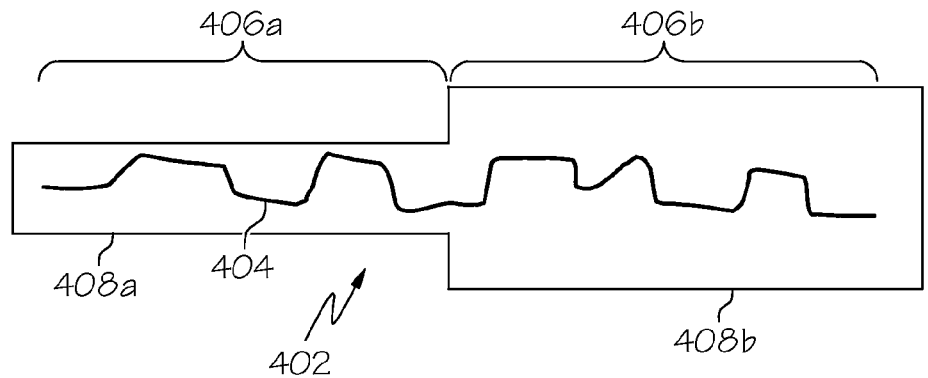
FIG. 4 illustrates an exemplary chipless RFID tag that has different coatings on different sections.

Referring now to FIG. 4, a coated chipless RFID tag 402 is illustrated. Chipless RFID tag 402, as the name implies, does not have an IC chip, but is only an antenna that is shaped to reflect back a portion of an interrogation signal. That is, the chipless RFID tag (also known as a Radio Frequency (RF) fiber) is physically shaped to reflect back select portions of a radio interrogation signal from an RF transmission source. Chipless RFID tag 402 typically has a much shorter range than the IC chip-enabled RFID tag 202 described above. Furthermore, the amount of information that chipless RFID tag 402 can store and return is much smaller than that of RFID tag 202 that has the on-board IC chip 204.

Still referring to FIG. 4, note that chipless RFID tag 402 has two sections: first section 406a and second section 406b. Surrounding the first section 406a is a first coating 408a, while the second section 406b is surrounded by a second coating 408b. First coating 408a and second coating 408b are analogous to the first and second coatings 308a-b described above in FIG. 3. That is, they may be the same or different materials that are non-persistent (e.g., dissolve) at different rates for same or different environmental conditions (e.g., chemicals, heat, cold, moisture, etc.).

Note that the functionality of the chipless RFID tag 402 depends on the total shape of the chipless RFID tag 402. Assume now that first coating 406a has been removed (due to exposure to a specific environmental condition), and that ambient conditions corrode or otherwise change the shape of the first section 406a. In this scenario, only the second section 406b is still functional in accordance with its original specification, and thus the digital signature that is returned by the chipless RFID tag 402 will be altered (since the first section 406a has been disabled).

Alternatively, the first and second coatings 406a-b may be Faraday shields, which initially prevent an RF interrogation of the chipless RFID tag 402. However, when one or another of the coatings 406a-b is removed, the exposed section of the chipless RFID tag 402 will then be able to respond to an RF interrogation, returning only the digital information associated with the shape of that exposed section of the chipless RFID tag 402.

The concept and feature of exposing portions of an RFID antenna, as described for chipless RFID tag 402 in FIG. 4, may be extended to the antenna 206 depicted in FIG. 2. That is, shielding or coating the antenna 206, in a manner described in FIG. 4 with a Faraday shielding material or a non-shielding protective material, may alter a transmission property of the antenna 206, by effectively shortening the antenna 206, resulting in a different wavelength that may be transmitted/received by the RFID chip 202.

Figure 5:
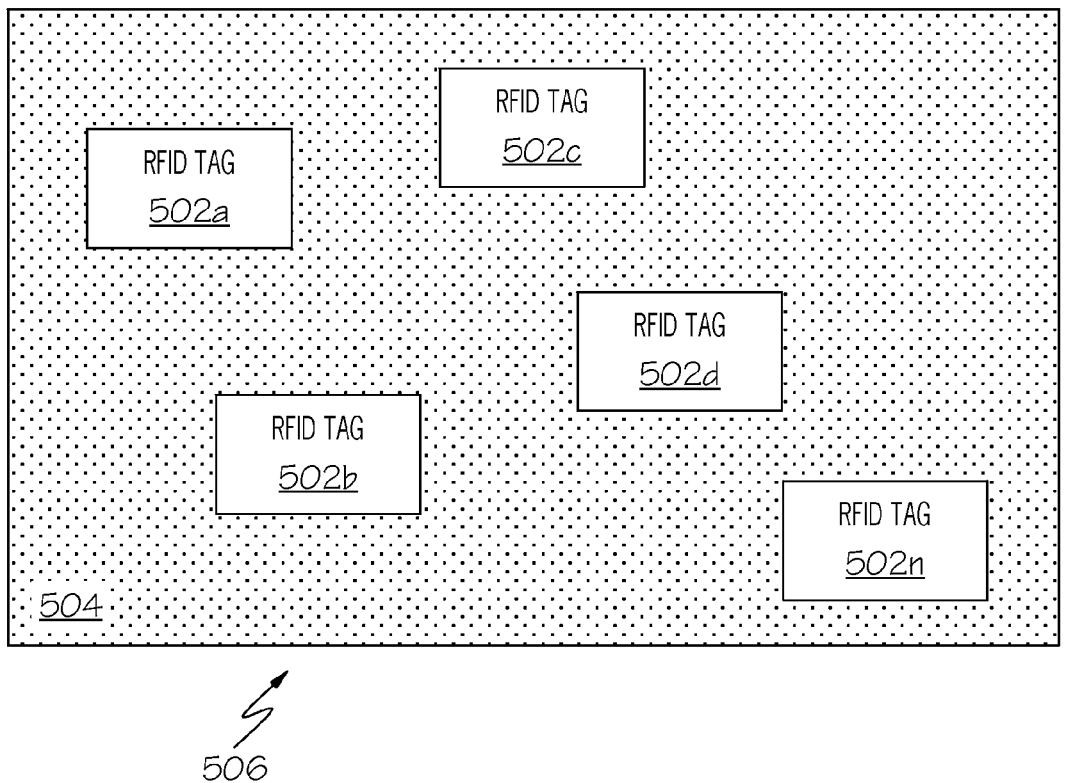
FIG. 5 depicts multiple RFID tags embedded in a free-flowing product that is contained in a vessel.

With reference now to FIG. 5, assume one or more RFID tags 502a-n, where "n" is an integer, are mixed in with a product, such as oil 504 stored in a tanker 506, and that RFID tags 502a-n have the structure of RFID tag 202 and/or chipless RFID tag 402 described above. Assume also that RFID tags 502a-n have coatings that are water soluble, and that the RFID tags 502a-n, when uncoated and exposed to water, become inoperable (no longer return a digital signal when interrogated by an RF signal from RF transmitter 122 shown in FIG. 1). Thus, if water contaminates the oil 504, then some or all of the RFID tags 502a-n will have an altered (if any) digital signal when interrogated by an RF signal, thus indicting that they have been exposed to the water contaminate.

Besides providing evidence of contamination, non-persistently coated RFIDs 502a-n can also be used to determine if proper tank cleaning has occurred. Assume now that the tanker 506 in FIG. 5 has been offloaded (all oil 504 has been drained off), and tanker 506 has been washed with water and/or steam-cleaned to remove any oil residue, so that the tanker 506 can be refilled with another product. Any RFID tag 502a-n remaining inside the tanker (including those that are mixed in with the oil 504 and/or are stuck to an interior wall of the tanker 506) will become disabled when they get wet. However, if the tanker has not been properly washed out, this situation will be indicated by a presence of operable RFID tags 502a-n.

Figure 6:
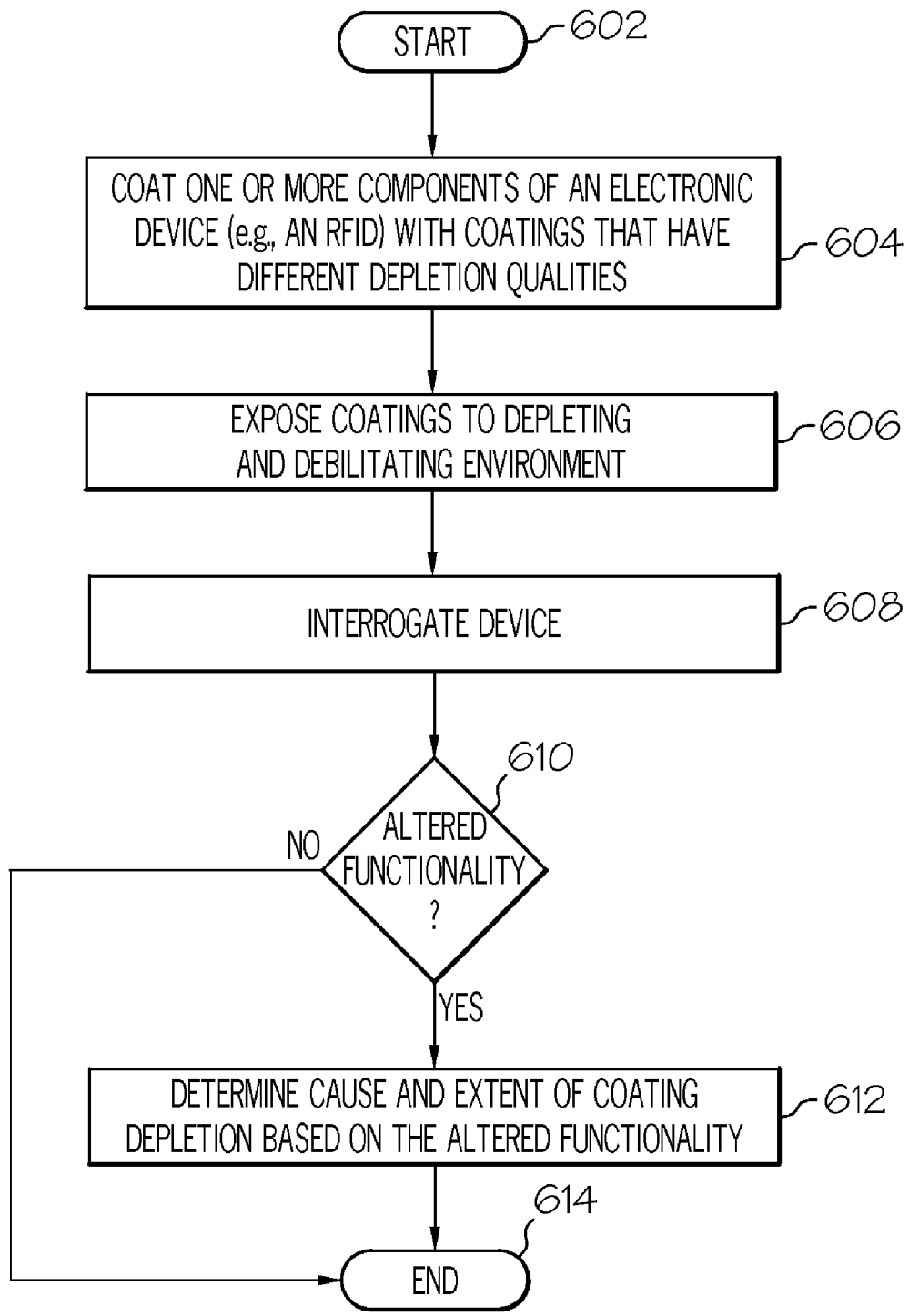
FIG. 6 is a high-level flow-chart of exemplary steps taken to create and/or utilize an electronic device that has been modified with a coating, thus permitting detection of exposure to one or more specified environmental conditions.

With reference now to FIG. 6, a high-level overview of steps taken to create and/or utilize electronic devices, including RFIDs, with a non-persistent coating to detect a presence or absence of a particular environmental condition is presented. After initiator block 602, one or more components of an electronic device are coated with coatings that have different depletion (erosion, sloughing, dissolving, etc.) qualities (block 604). As described above, the electronic device may be any electronic device, including but not environmentally-sensitive non-persistent material chosen for a particular application. That is, if the past presence of heat is to be detected, then the coating will be made of a material that has a low melting point. If the past presence of a particular chemical (including water) is to be detected, then the coating will be soluble in that particular chemical. If the past presence of radiation is to be detected, then the coating will crumble or otherwise melt/break away when exposed to a particular level of radiation. These examples of coatings and their respective environmental sensitivities are not to be construed as being exhaustive.

The coatings are then exposed to a depleting environment that will cause the coating to be stripped off its component. In addition, the underlying component is exposed to a debilitating environment, such as water, a solvent, heat, etc., that alters the operation of the underlying component (block 606). This debilitating environment may the same as, or different from, the depleting environment that stripped off the coating.

After the electronic device is interrogated (block 608), a determination is made as to whether the operation of the electronic device has changed by being exposed to a depleting environment (material, liquid, heat, radiation, etc. that removes the protective coating from one or more components) and a debilitating environment (material, liquid, heat, radiation, etc. that alters the functionality of the component on contact), as described in query block 610. Note that the depleting environment and the debilitating environment may be the same or different. The process of interrogating and evaluating the electronic device may be performed by the computer 102, shown in FIG. 1, through the use of a sensor such as RFID sensor 126 and the processing power found in the rest of the computer 102, including but not limited to RFIDSI 148 and processor unit 104. Interrogating the electronic device may be performed by checking to see if one or more of the previously coated components is still functional. An exemplary type of such interrogation is to expose an RFID tag to an RF interrogation signal (i.e., block 608), in order to determine if the RFID tag returns an altered digital signature (i.e., block 610). If the functionality (i.e., the digital signature return) is altered, then the cause of the alteration can be qualified/quantified (block 612). For example, if it is known that exposing RFID tags to water will cause them to lose their ability to respond with their original digital signal, then it can be determined that the RFID tags (and any material in their vicinity) have been exposed to water in the past. By coating different RFID tags, or components of the RFID tags, with different thicknesses of coatings, then a calculation can be made to determine the extent of the exposure to water (i.e., how wet the material and RFID tags got). The process ends at terminator block 614, which may initiate a search for the source of the exposure to the environmental condition that stripped off the protective coating(s) on the RFID tag(s) or other electronic devices.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method of detecting that a Radio Frequency Identification (RFID) tag has been exposed to a debilitating environment, the method comprising:
    interrogating a Radio Frequency Identification (RFID) tag that is proximate to a product, wherein interrogating the RFID tag with a radio signal generates an expected response signal when the RFID tag has at least one component that is covered with a first type of protective coating; and
    in response to the interrogating of the RFID tag generating an altered response signal from the RFID tag instead of the expected response signal, determining that the first type of protective coating has been removed from the at least one component as a result of an exposure to a depleting environment, wherein the at least one component is exposed to a debilitating environment when the first type of protective coating is removed, and wherein the exposure to the debilitating environment alters a normal operation of the RFID tag to cause the generation of the altered response signal rather than the expected response signal;
    wherein said at least one component is a first component that is different from a second component that is covered by a second type of protective coating that has different depletion properties from the first type of protective coating, wherein the first type of protective coating is first removed and first exposes the first component to the debilitating environment before the second type of protective coating is removed.

2. The method of claim 1, wherein the altered response signal differs from an original digital signal that is generated when the protective coating remains on the RFID tag.

3. The method of claim 1, wherein the product is a free-flowing product, and wherein the RFID tag is suspended unadhered to the free-flowing product in a colloidal state.

4. The method of claim 1, wherein the depleting environment is a material that is harmful to the product, such that the altered response signal indicates that the product has been damaged.

5. The method of claim 1, wherein the depleting environment is a material that is harmful to a consumer of the product, such that the altered response signal indicates that the product is unsafe for consumption by the consumer.

6. A method of detecting that a Radio Frequency Identification (RFID) tag has been exposed to a debilitating environment, the method comprising:
    interrogating a Radio Frequency Identification (RFID) tag that is proximate to a product, wherein interrogating the RFID tag with a radio signal generates a response signal, and wherein the RFID tag has at least one component that has a corresponding protective coating;
    in response to the interrogating of the RFID tag generating an altered response signal from the RFID tag, determining that the corresponding protective coating has been removed as a result of an exposure to a depleting environment, wherein the at least one component is exposed to a debilitating environment when the corresponding protective coating is removed, and wherein the debilitating environment alters a normal operation of the RFID tag;
    wherein the RFID tag comprises an integrated circuit that has a first component and a second component, wherein the first component has a first coating and the second component has a second coating, wherein the first and second coatings have different depletion properties when exposed to the depleting environment, such that the first coating is removed by the depleting environment faster than the second coating, and wherein the altered response signal is generated when the first component becomes disabled by exposure to the debilitating environment.

7. The method of claim 6, wherein the first component is a first memory that stores a first segment of an original digital signature of the RFID tag, and wherein the second component is a second memory that stores a second segment of the original digital signature of the RFID tag.

8. A method of detecting that a Radio Frequency Identification (RFID) tag has been exposed to a debilitating environment, the method comprising:
    interrogating a Radio Frequency Identification (RFID) tag that is proximate to a product, wherein interrogating the RFID to with a radio signal generates a response signal, and wherein the RFID tag has at least one component that has a corresponding protective coating;
    in response to the interrogating of the RFID tag generating an altered response signal from the RFID tag, determining that the corresponding protective coating has been removed as a result of an exposure to a depleting environment, wherein the at least one component is exposed to a debilitating environment when the corresponding protective coating is removed, and wherein the debilitating environment alters a normal operation of the RFID tag;

wherein the RFID tag is a chipless RFID tag composed of a uniquely shaped antenna for reflecting back a digital signature, wherein the antenna has a first section that is coated by a first coating and a second section that is coated by a second coating, wherein the first and second coatings have different depletion properties when exposed to the depleting environment, and wherein the altered digital signal is generated when only the first section becomes disabled when exposed to the debilitating environment.

9. The method of claim 1, wherein the depleting environment is high heat that is sufficient to melt away the protective coating.

10. A Radio Frequency Identification (RFID) chip having an original digital signature, the RFID chip comprising:

a first component having a first coating; and a second component having a second coating, wherein the first coating and the second coating have different depletion properties when exposed to a depleting environment, wherein exposing the RFID chip to the depleting environment results in the first coating being removed to expose the first component while the second component remains protected by the second coating, and wherein removing the first coating alters a functionality of the first component such that, when interrogated by a Radio Frequency (RF) signal, the RFID chip generates an altered digital signature that is different from the original digital signature.

11. The RFID chip of claim 10, wherein the first component is a first memory that stores a first component of the original digital signature, and wherein the second component is a second memory that stores a second component of the original digital signature.

12. The RFID chip of claim 10, wherein the RFID tag is a chipless RFID tag composed of a uniquely shaped antenna for reflecting back a reflected digital signature, wherein the first component is a first section of the uniquely shaped antenna and the second component is a second section of the uniquely shaped antenna, and wherein the altered digital signal is generated when the first section becomes disabled when exposed to a debilitating environment.

13. The RFID chip of claim 10, wherein the RFID tag is a chipless RFID tag composed of a uniquely shaped antenna for reflecting back a reflected digital signature, wherein the first component is a first section of the uniquely shaped antenna and the second component is a second section of the uniquely shaped antenna, wherein the first coating is a Faraday shield, and wherein the altered digital signal is generated when the first section becomes enabled when the first coating is removed by the depleting environment.

14. A system comprising:

a processor; and a Radio Frequency Identification (RFID) sensor coupled to processor, wherein the RFID sensor is enabled to interrogate an RFID tag that has at least one component that has a first-type of protective coating, wherein the at least one component is exposed to a debilitating environment when the first type of protective coating is removed, and wherein exposure to the debilitating environment alters a normal operation of the RFID tag to cause the generation of an altered response signal rather than an expected response signal which is generated when the at least one component is covered by the first-type of protective coating;

wherein the processor is enabled to, in response to receiving an altered response signal from the RFID tag, determining that the protective coating has been removed due to an exposure to a depleting environment, thus exposing the at least one component to a debilitating environment that alters a normal functionality of the RFID tag; and wherein said at least one component is a first component that is different from a second component that is covered by a second type of protective coating that has different depletion properties from the first type of protective coating, wherein the first type of protective coating is first removed and first exposes the first component to the debilitating environment before the second type of protective coating is removed.

15. The system of claim 14, wherein the altered response signal differs from an original digital signal that is generated when the RFID tag is undamaged.

16. The system of claim 14, wherein the depleting environment is a material that is harmful to the product, such that the altered response signal indicates that the product has been damaged.

17. The system of claim 14, wherein the depleting environment is a material that is harmful to a consumer of the product, such that the altered response signal indicates that the product is unsafe for consumption by the consumer.

18. A system comprising:

a processor; and a Radio Frequency Identification (RFID) sensor coupled to processor, wherein the RFID sensor is enabled to interrogate an RFID tag that has at least one component that has a protective coating;

wherein the processor is enabled to, in response to receiving an altered response signal from the RFID tag, determining that the protective coating has been removed due to an exposure to a depleting environment, thus exposing the at least one component to a debilitating environment that alters a normal functionality of the RFID tag;

wherein the altered response signal differs from an original digital signal that is generated when the RFID tag is undamaged;

wherein the RFID tag comprises an integrated circuit that has a first component and a second component, wherein the first component has a first coating and the second component has a second coating, wherein the first and second coatings have different depletion properties when exposed to the depleting environment, and wherein the altered response signal is generated when the first component becomes disabled by exposure to the debilitating environment.

19. The system of claim 18, wherein the first component is a first memory that stores a first component of the original digital signature, and wherein the second component is a second memory that stores a second component of the original digital signature.

20. An electronic device comprising:

a first component having a first coating; and a second component having a second coating, wherein the first coating and the second coating have different persistence properties when exposed to a depleting environment, wherein exposing the electronic device to the depleting environment results in the first coating being removed to expose the first component while the second component remains protected by the second coating, and wherein removing the first coating affects the first component such that an overall function of the electronic device is altered.

* * * * *